United States Patent
Oke

(10) Patent No.: US 7,383,167 B2
(45) Date of Patent: Jun. 3, 2008

(54) METHODS AND SYSTEMS FOR MODELING POWER PLANTS

(75) Inventor: Harsh Pramod Oke, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 456 days.

(21) Appl. No.: 10/766,991

(22) Filed: Jan. 29, 2004

(65) Prior Publication Data

US 2005/0171748 A1 Aug. 4, 2005

(51) Int. Cl.
G06G 7/54 (2006.01)
(52) U.S. Cl. .............................. 703/18; 60/782; 60/778; 60/772; 60/773; 73/862.041; 706/182; 706/21; 706/45; 706/25
(58) Field of Classification Search .................. 703/18, 703/2, 6; 717/174; 700/266, 287, 30, 288, 700/28; 415/170.1; 376/260; 60/782; 702/182, 702/34
See application file for complete search history.

(56) References Cited

U.S. PATENT DOCUMENTS

| | | | |
|---|---|---|---|
| 4,042,813 A * | 8/1977 | Johnson ....................... 703/18 |
| 4,064,392 A * | 12/1977 | Desalu ......................... 703/18 |
| 4,255,787 A * | 3/1981 | Hoffmann et al. .......... 700/287 |
| 4,805,457 A | 2/1989 | Oates et al. |
| 5,159,562 A * | 10/1992 | Putman et al. .............. 700/288 |
| 5,331,579 A * | 7/1994 | Maguire et al. ............... 703/2 |
| 5,619,433 A * | 4/1997 | Wang et al. .................. 703/18 |
| 5,809,490 A * | 9/1998 | Guiver et al. ................ 706/16 |
| 5,953,238 A | 9/1999 | Mowry et al. |
| 6,473,480 B1 * | 10/2002 | Kruger et al. .............. 376/260 |
| 6,499,002 B1 | 12/2002 | Lancaster |
| 6,584,779 B2 * | 7/2003 | Priestley ...................... 60/782 |
| 6,589,010 B2 | 7/2003 | Itzel et al. |
| 6,591,166 B1 * | 7/2003 | Millett et al. ............... 700/266 |
| 6,591,225 B1 * | 7/2003 | Adelman et al. ........... 702/182 |
| 6,626,635 B1 | 9/2003 | Prowse et al. |
| 6,804,612 B2 * | 10/2004 | Chow et al. .................. 702/34 |
| 6,917,839 B2 * | 7/2005 | Bickford ...................... 700/30 |
| 7,016,742 B2 * | 3/2006 | Jarrell et al. .................. 700/28 |
| 7,020,595 B1 * | 3/2006 | Adibhatla et al. ............. 703/7 |
| 7,059,827 B1 * | 6/2006 | Ingistov ................... 415/170.1 |
| 7,200,520 B2 * | 4/2007 | Appel et al. ................ 702/182 |
| 2003/0063702 A1 * | 4/2003 | Kruger et al. .............. 376/260 |
| 2003/0083827 A1 * | 5/2003 | Chow et al. .................. 702/34 |
| 2003/0208490 A1 * | 11/2003 | Larrea et al. .................. 707/9 |
| 2004/0181422 A1 * | 9/2004 | Brand ............................ 705/1 |
| 2005/0086635 A1 * | 4/2005 | Parikh et al. ............... 717/103 |
| 2005/0102668 A1 * | 5/2005 | Morgenstern ............... 717/174 |
| 2005/0171748 A1 * | 8/2005 | Oke ................................ 703/6 |

* cited by examiner

*Primary Examiner*—Kamini Shah
*Assistant Examiner*—Cuong Van Luu
(74) *Attorney, Agent, or Firm*—Armstrong Teasdale LLP

(57) ABSTRACT

A modular method of modeling a power plant includes selecting a major component module model from a library of component module models for each major component of the power plant, with each major component module representing a power plant major component of a unique configuration. The method also includes inputting initial model information into a database for the selected modules, with the initial model information including at least convergence criteria and a maximum number of passes. The method further includes running the modular model by running each selected module and enabling data exchange between the selected modules.

11 Claims, 10 Drawing Sheets

| | A | B | C | D | E |
|---|---|---|---|---|---|
| 1 | Column # --> | 2 | 3 | 4 | 5 |
| 2 | Export/Import range definition area | StartRow | EndRow | ActiveColumn | |
| 3 | HR1toST | 168 | 178 | 5 | x |
| 4 | HR1fromST | 23 | 29 | | x |
| 5 | STtoHR1 | 127 | 133 | 5 | x |
| 6 | STfromHR1 | 23 | 33 | | x |
| 7 | HR2toST | 168 | 178 | 5 | x |
| 8 | HR2fromST | 23 | 29 | | x |
| 9 | STtoHR2 | 136 | 142 | | |
| 10 | STfromHR2 | 38 | 48 | | |
| 11 | HR3toST | | | | |
| 12 | HR3fromST | | | | |
| 13 | STtoHR3 | | | | |
| 14 | STfromHR3 | | | | |
| 15 | STtoCD | 145 | 146 | | x |
| 16 | STfromCD | 53 | 56 | | x |
| 17 | CDtoST | 47 | 50 | 5 | x |
| 18 | CDfromST | 23 | 24 | | x |
| 19 | Convergence check area | | | | |
| 20 | HR1_STIntface | 25 | 31 | 2 | x |
| 21 | HR2_STIntface | 25 | 31 | 3 | x |
| 22 | HR3_STIntface | | | | |
| 23 | ST_CDIntface | 25 | 28 | 5 | x |
| 24 | Interfaces | HR1-ST interface | HR2-ST interface | | ST-CD interface |
| 25 | | 0E+00 | 0E+00 | | 0E+00 |
| 26 | | 8E-08 | 8E-08 | | 2E-07 |
| 27 | | 0E+00 | 0E+00 | | 0E+00 |
| 28 | | 0E+00 | 0E+00 | | 0E+00 |
| 29 | | 0E+00 | 0E+00 | | |
| 30 | | 0E+00 | 0E+00 | | |
| 31 | | 3E-06 | 3E-06 | | 3E-06 |
| 32 | | | | | |

METHODS AND SYSTEMS FOR MODELING POWER PLANTS

BACKGROUND OF THE INVENTION

This invention relates generally to power plants, and more particularly to modular modeling of power plants.

Some known power plants include a number of major components, for example, a gas turbine, a heat recovery steam generator, a steam turbine, and a condenser/cooling tower. To assess the performance of the power plant each of the major components are analyzed, for example, using modeling techniques. Because the configuration of major components can vary from power plant to power plant, custom models for each power plant are developed that take into account the specific configurations of the major component of the specific power plant. The development of plant specific models incurs high costs and considerable time.

Some modeling systems have attempted to embed alternate configurations of some major components in a single model. However, this approach produces a very complex model that can result in longer times to solve the model, i.e., longer convergence times.

BRIEF DESCRIPTION OF THE INVENTION

In one aspect, a modular method of modeling a power plant is provided. The power plant includes a plurality of major components including at least one of a gas turbine, a heat recovery steam generator, a steam turbine, and a condenser/cooling tower. The method includes selecting a major component module model from a library of component module models for each major component of the power plant, with each major component module representing a power plant major component of a unique configuration. The method also includes inputting initial model information into a database for the selected modules, with the initial model information including at least one of operating parameters, design data, convergence criteria, and a maximum number of passes. The method further includes running the modular model by running each selected module and enabling data exchange between the selected modules.

In another aspect, a modular method of modeling a power plant having a plurality of components is provided. The method includes selecting at least two component module models from a library of component modules, with each component module representing a power plant component of a unique configuration, inputting initial model information into a database for the selected modules, the initial model information including at least one of operating parameters, design data, convergence criteria, and a maximum number of passes, and running the modular model by running each selected module and exchanging data between the selected modules.

In another aspect, a modular method of modeling a power plant is provided. The power plant includes a plurality of major components including at least one of a gas turbine, a heat recovery steam generator, a steam turbine, and a condenser/cooling tower. The method includes creating a power plant model by selecting a major component module model from a library of component module models for each major component of the power plant, with each major component module representing a power plant major component of a unique configuration. The method also includes linking the selected modules together to enable data exchange between modules, inputting initial model information into a database for the selected modules, with the initial model information including at least one of operating parameters, design data, convergence criteria and a maximum number of passes, and running the modular model by running each selected module and exchanging data between the selected modules.

In another aspect, a power plant modular modeling system that includes a database operationally coupled to a computer is provided. The database includes a library of power plant major component module models, with each major component module representing a power plant major component of a unique configuration. The computer is configured to create a power plant model by selecting a major component module model from the library of component module models for each major component of the power plant, link the selected modules together to enable data exchange between modules, and receive initial model information from a user for the selected modules. The initial model information includes at least one of operating parameters, design data, convergence criteria, and a maximum number of passes. The computer is further configured to run the modular model by running each selected module including exchanging data between the selected modules.

BRIEF DESCRIPTION OF THE DRAWINGS

FIG. 8 is an exemplary screen shot of a spreadsheet page that includes model control information.

FIG. 9 is an exemplary screen shot of a spreadsheet page that includes data associated with first heat recovery steam generator model module.

DETAILED DESCRIPTION OF THE INVENTION

A modular method of modeling power plants is described below in detail. The modular method of modeling power plants is used to assess the performance of major components and the equipment constituting the major components of the power plants. The speed and efficiency of the modular modeling method described below reduces performance analysis time and makes performance assessments of different plants with differences in the configuration of their major components commercially viable.

Figure 1:
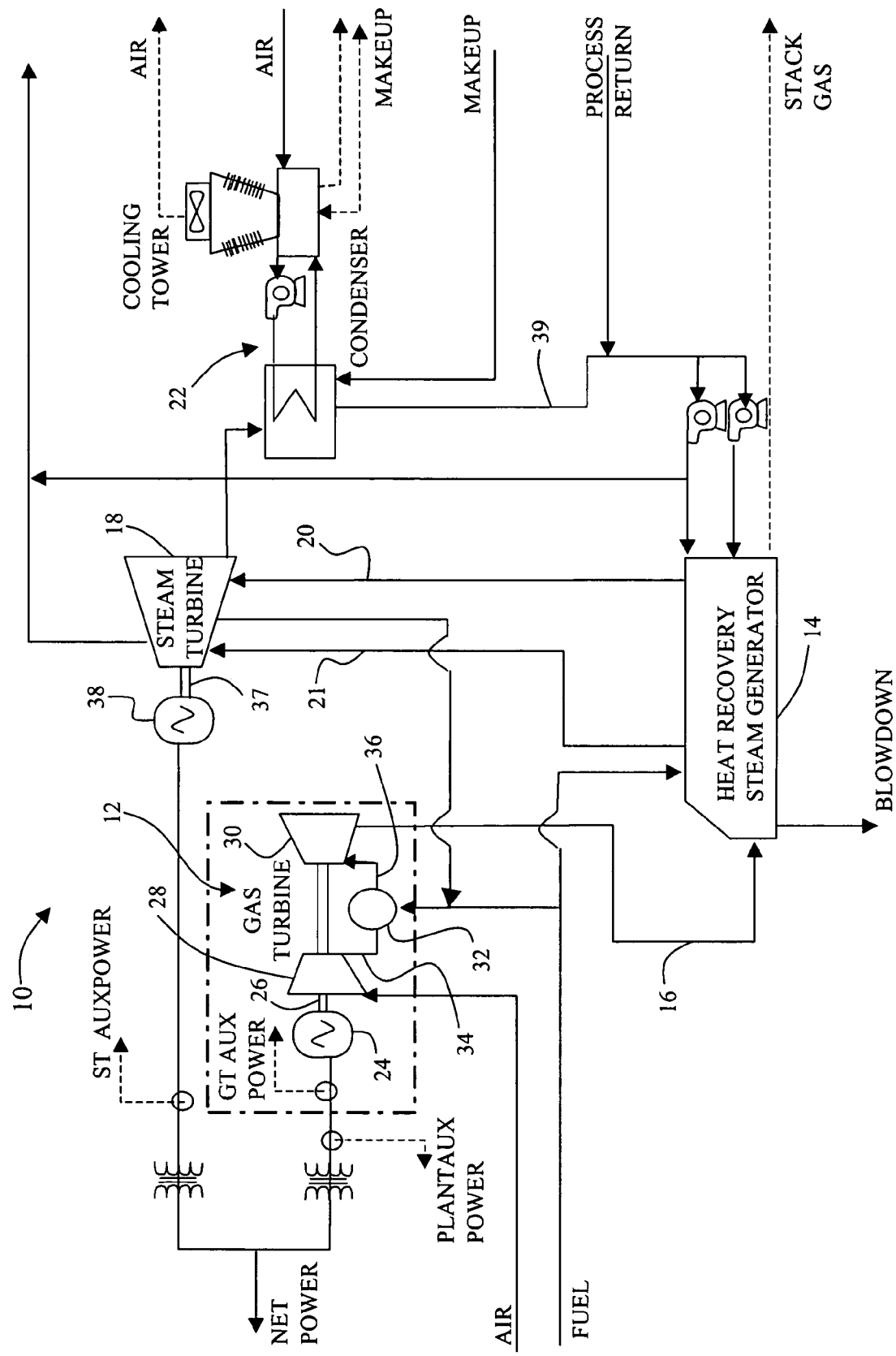
FIG. 1 is schematic illustration of an exemplary power plant.

Referring to the drawings, FIG. 1 is as schematic illustration of an exemplary combined cycle power plant 10. In the exemplary embodiment, power plant 10 includes a gas turbine 12 coupled to a heat recovery steam generator (HRSG) 14. Exhaust gases exit gas turbine 12 and are directed to a heat recovery steam generator (HRSG) 14 by an exhaust line 16. Steam generated by HRSG 14 is directed to a steam turbine 18 by steam lines 20 and 21. Spent steam is directed to a condenser/cooling tower (CD/CT) 22.

In the exemplary embodiment, plant 10 includes an electrical generator 24 coupled through a shaft 26 to gas turbine engine 12. Gas turbine 12 includes a compressor section 28 coupled to a turbine section 30 through shaft 26. A combustor section 32 is coupled between compressor 28 and turbine section 30, such that a compressor outlet 34 is coupled in flow communication with a turbine inlet 36 through combustor section 32. Depleted exhaust gases exit turbine section 30 through exhaust line 16. As exhaust gases are channeled through passages in HRSG 14, heat energy in the gases converts water flowing through HRSG 14 into steam. The exhaust gases are then discharged from HRSG 14 and released to the atmosphere or to a pollution control device (not shown). Steam produced in HRSG 14 is routed to steam turbine 18 through steam lines 20 and 21. An electrical generator 38 is coupled to steam turbine 18 through a shaft 37. Spent steam is routed to CD/CT 22 through steam line 39 and steam condensate is directed back to HRSG 14 where it is again heated to steam in a continuous cycle.

Figure 2:
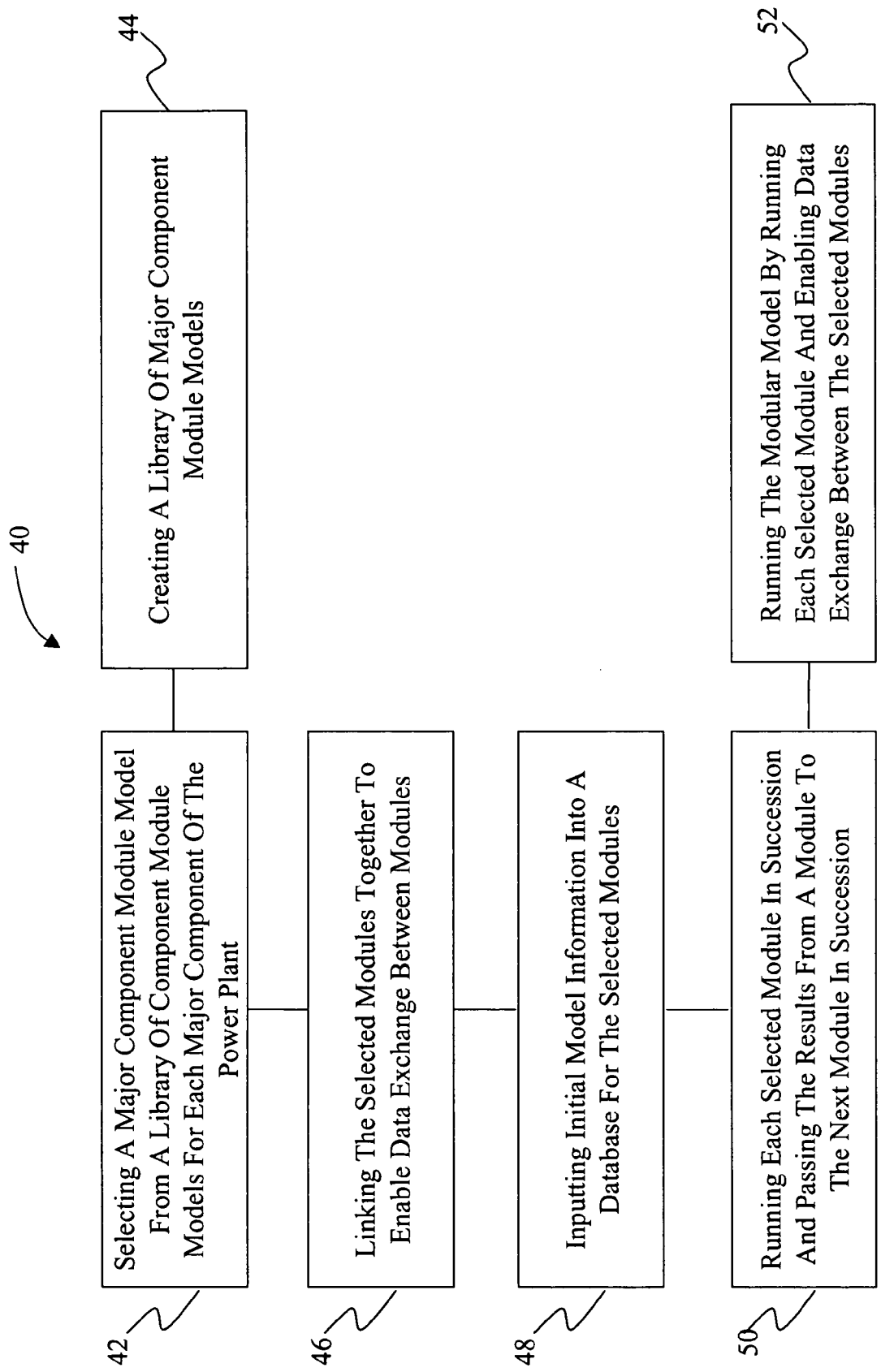
FIG. 2 is a flow chart of an exemplary modular method of modeling a power plant.

FIG. 2 is a flow chart of an exemplary modular method 40 of modeling power plant 10 to assess the performance of major components and the equipment of the major components of power plant 10. In an exemplary embodiment, modular method 40 includes selecting 42 a major component module model from a library of component module models for each major component of power plant 10. Each major component module represents a major component of a unique configuration. The major components of power plant 10 include, as described above, gas turbine 12, HRSG 14, steam turbine 16, and CD/CT 22. Alternate embodiments of plant 10 can include one or more of each of these major components. Method 40 includes creating 44 a library of major component module models. The modules are developed utilizing any suitable modeling software, for example, GateCycle™ software commercially available from General Electric Company. Each module model has a unique major component configuration and is stored in a library database.

Method 40 also includes linking 46 the selected modules together to enable data exchange between modules and inputting 48 initial model information into a database for the selected modules. Initial model information includes, for example, convergence criteria, maximum number of passes through the modules, process parameters, measured process data, and design data. The initial model information, in one embodiment, is entered into a spreadsheet associated with each selected module. Any commercially available spreadsheet program can be used, for example, EXCEL available from Microsoft Corporation. In the exemplary embodiment, the initial model information for each module is entered into a separate spreadsheet page in an EXCEL spreadsheet workbook. Linking of selected modules is accomplished by commands embedded in the EXCEL spreadsheet which enables data exchange between the selected modules. The embedded commands can be, for example, Visual Basic commands that enable the selected modules to exchange data with each other.

Model 40 further includes running 50 model 40 by running each selected module 44 and enabling data exchange between the selected modules 44. Running 50 model 40 includes running 52 each selected module 44 in succession and passing the results from a given module 44 to the next module 44 in succession.

Figure 3:
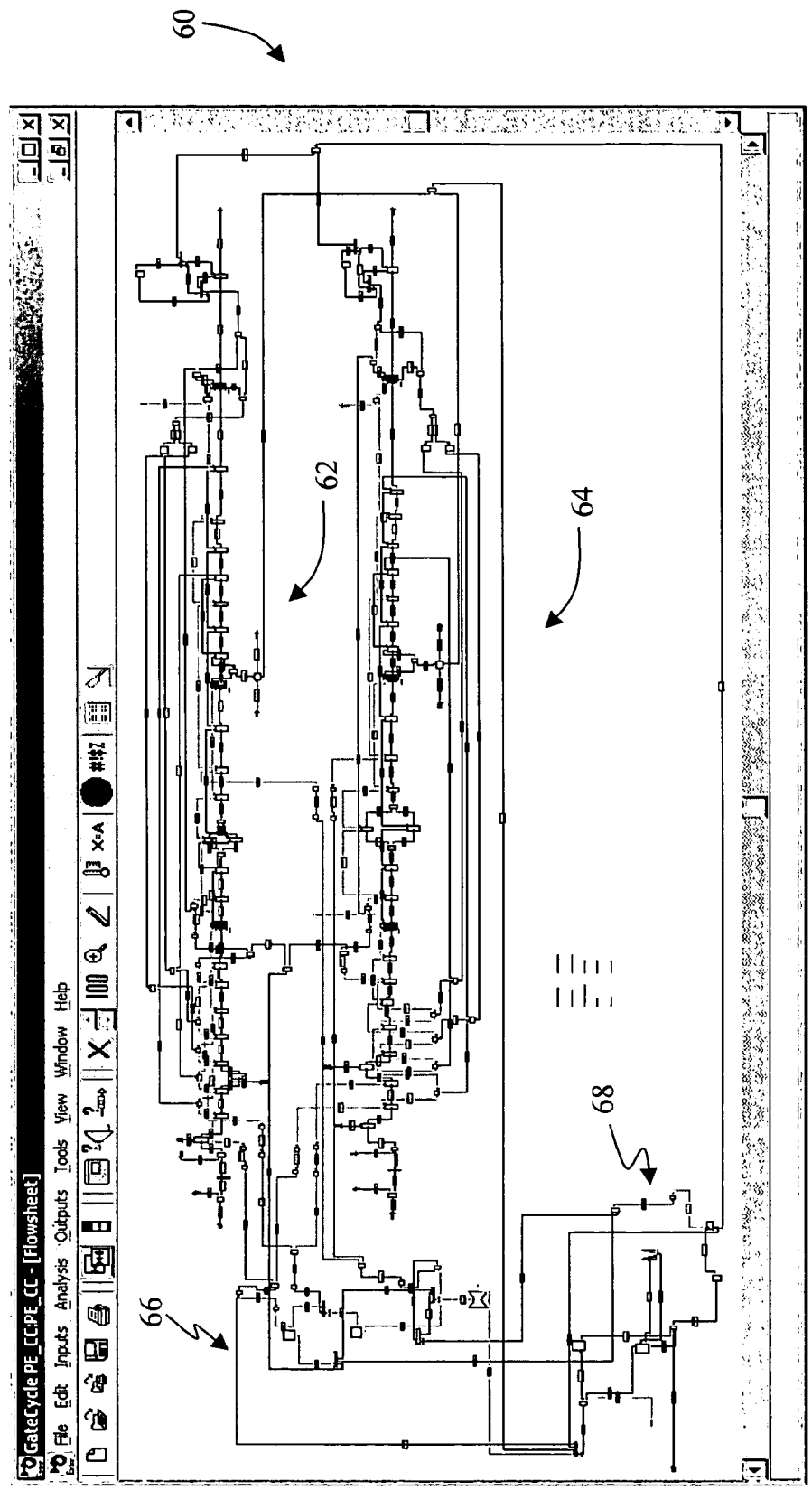
FIG. 3 is a screen shot of a known exemplary model for a bottoming cycle of a 2×1 combined cycle power plant.

FIG. 3 is a screen shot of a known model 60 for a bottoming cycle of a 2×1 combined cycle power plant. A 2×1 power plant includes two gas turbines and one steam turbine. Model 60 includes the major components of the power plant in one large model. The major components evaluated in a bottoming cycle include a first HRSG 62, a second HRSG 64, a steam turbine 66, and a CD/CT 68. Large model 60 is designed for a specific power plant and has to be revised to be used on a similar power plant with major components of a different configuration. Revising model 60 for use with a different plant is time consuming and requires considerable effort.

Figure 4:
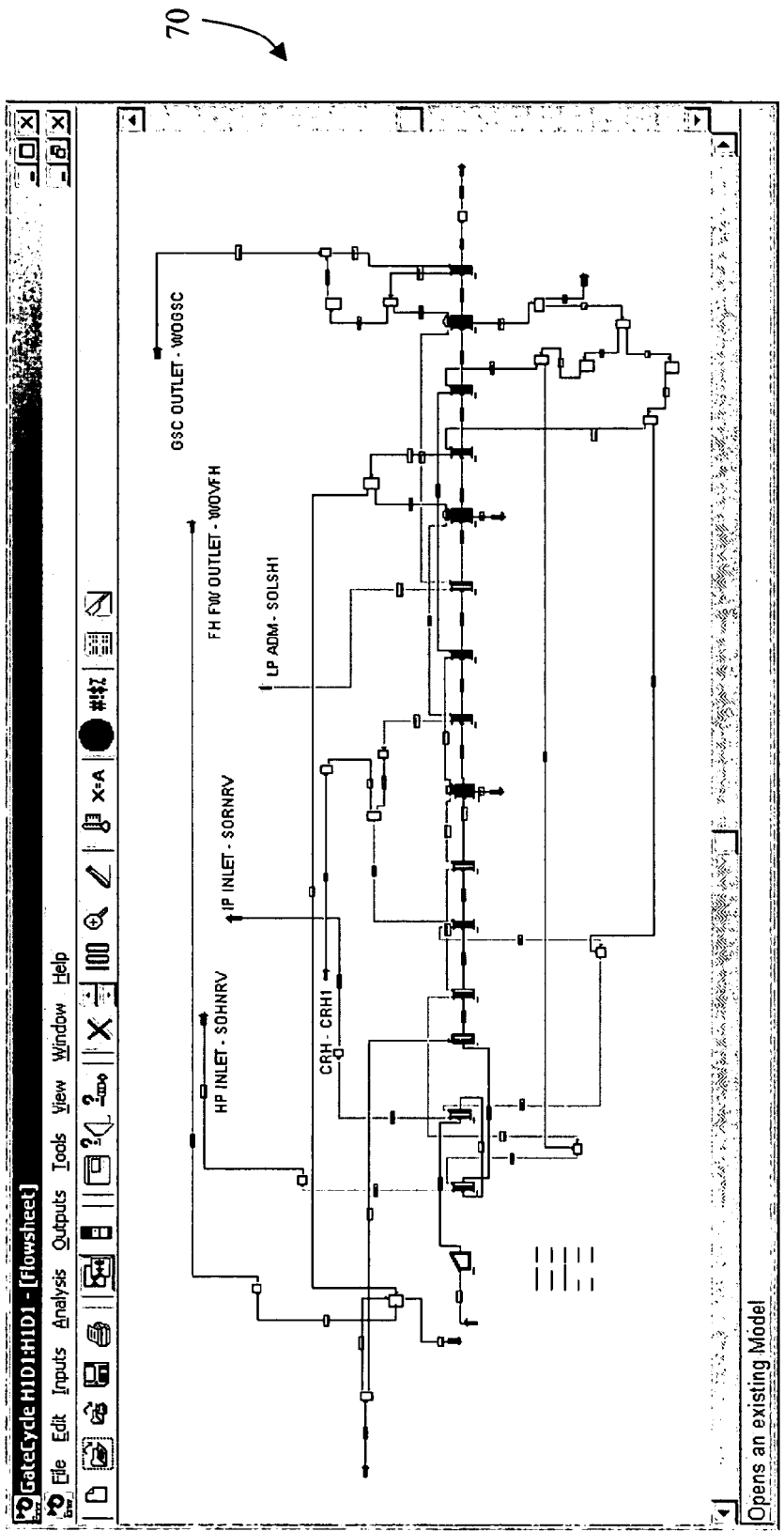
FIG. 4 is an exemplary screen shot of a first heat recovery steam generator model module for a modular modeling method in accordance with an embodiment of the invention.
Figure 5:
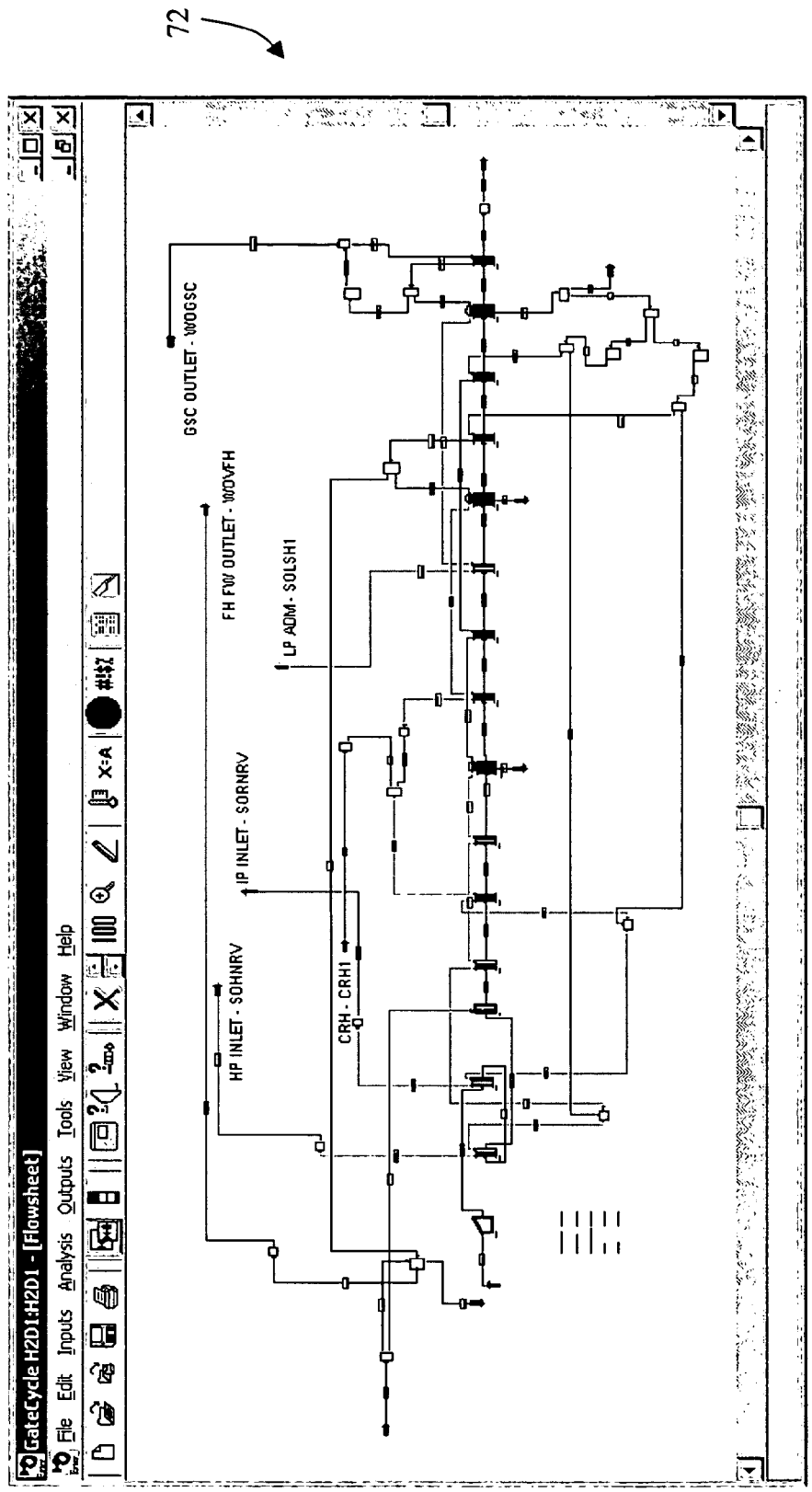
FIG. 5 is an exemplary screen shot of a second heat recovery steam generator model module for the modular modeling method in accordance with an embodiment of the invention.
Figure 6:
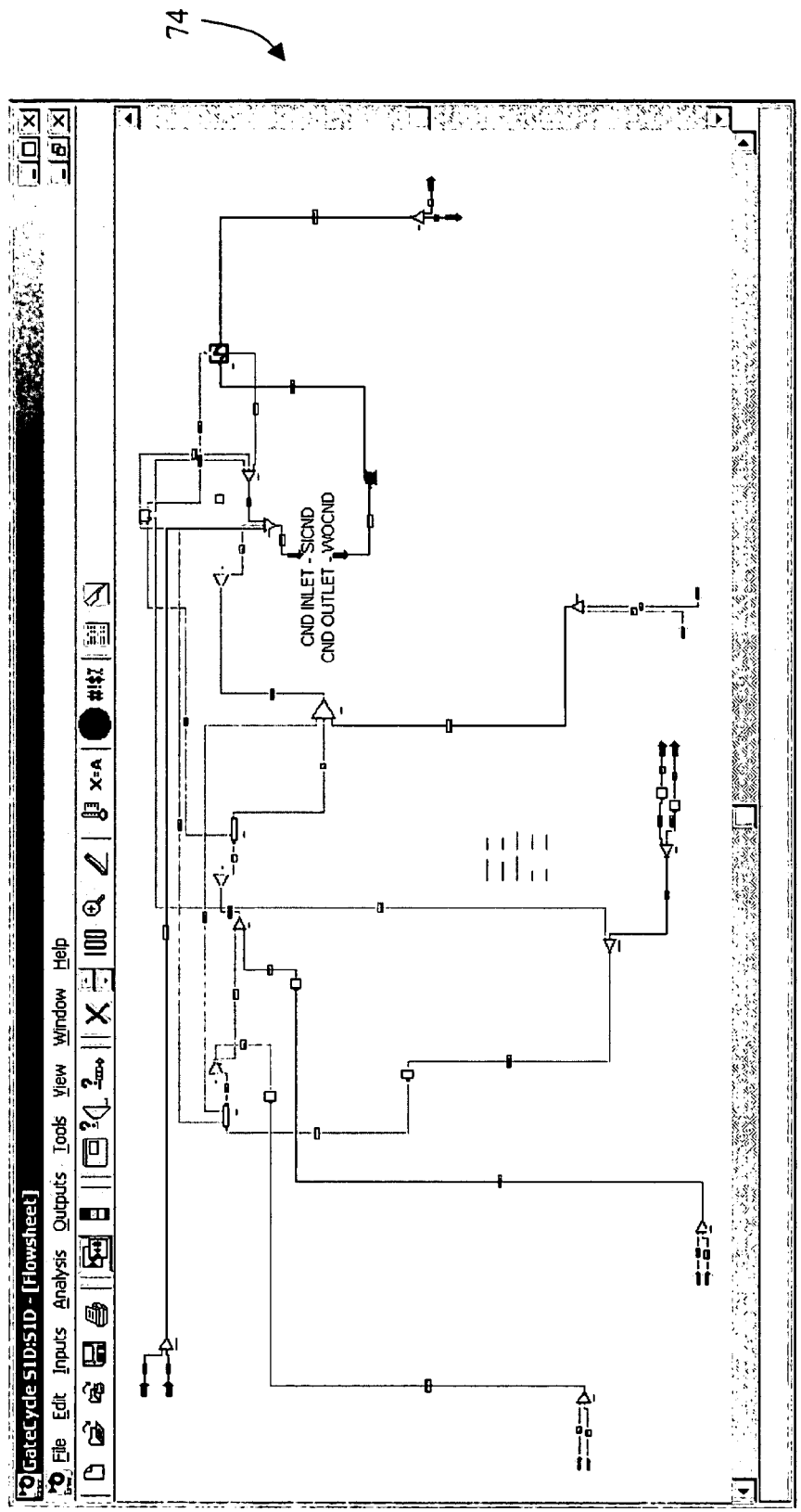
FIG. 6 is an exemplary screen shot of a steam turbine model module for the modular modeling method in accordance with an embodiment of the invention.
Figure 7:
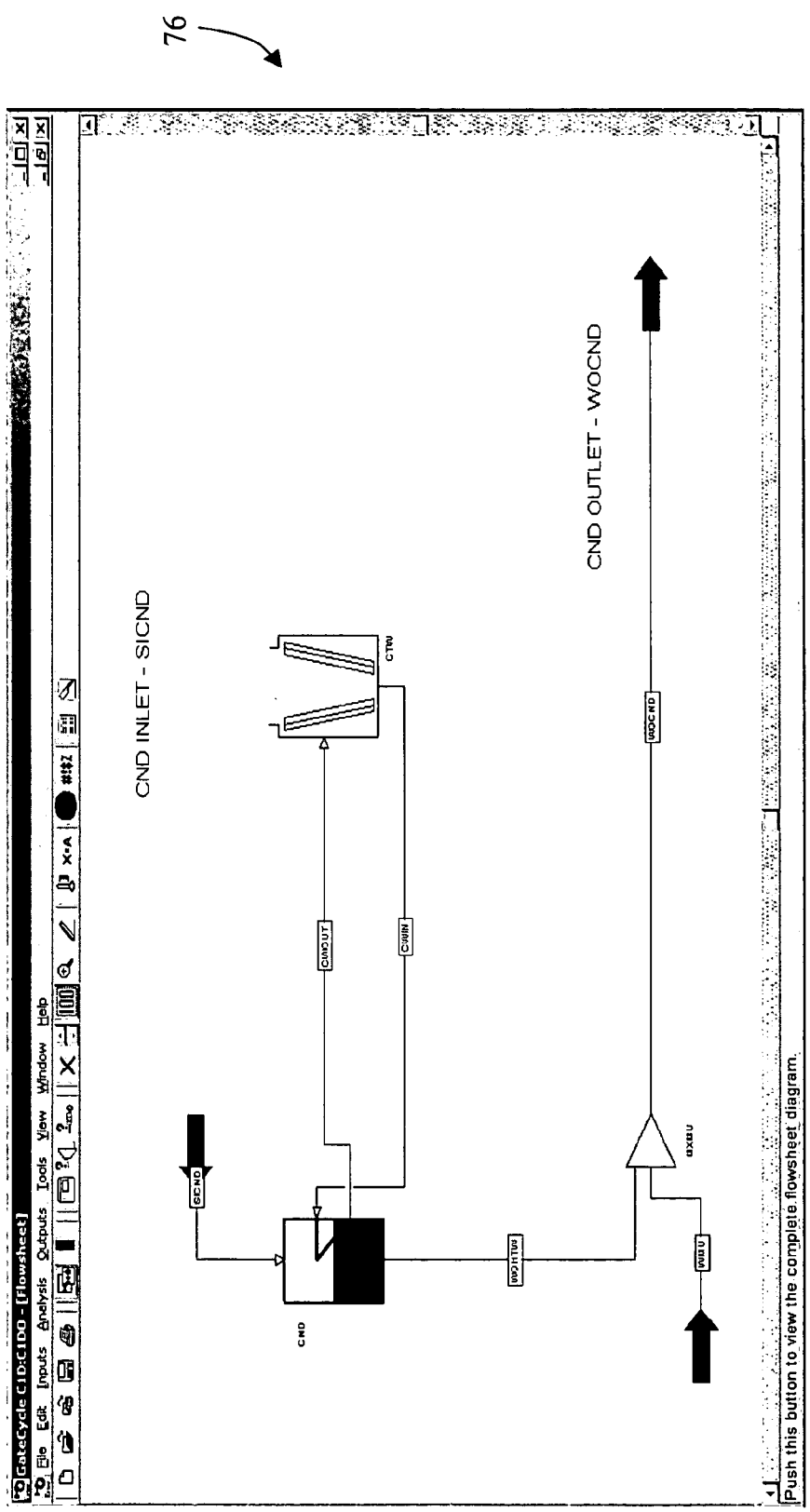
FIG. 7 is an exemplary screen shot of a condenser/cooling tower model module for the modular modeling method in accordance with an embodiment of the invention.
Figure 9:
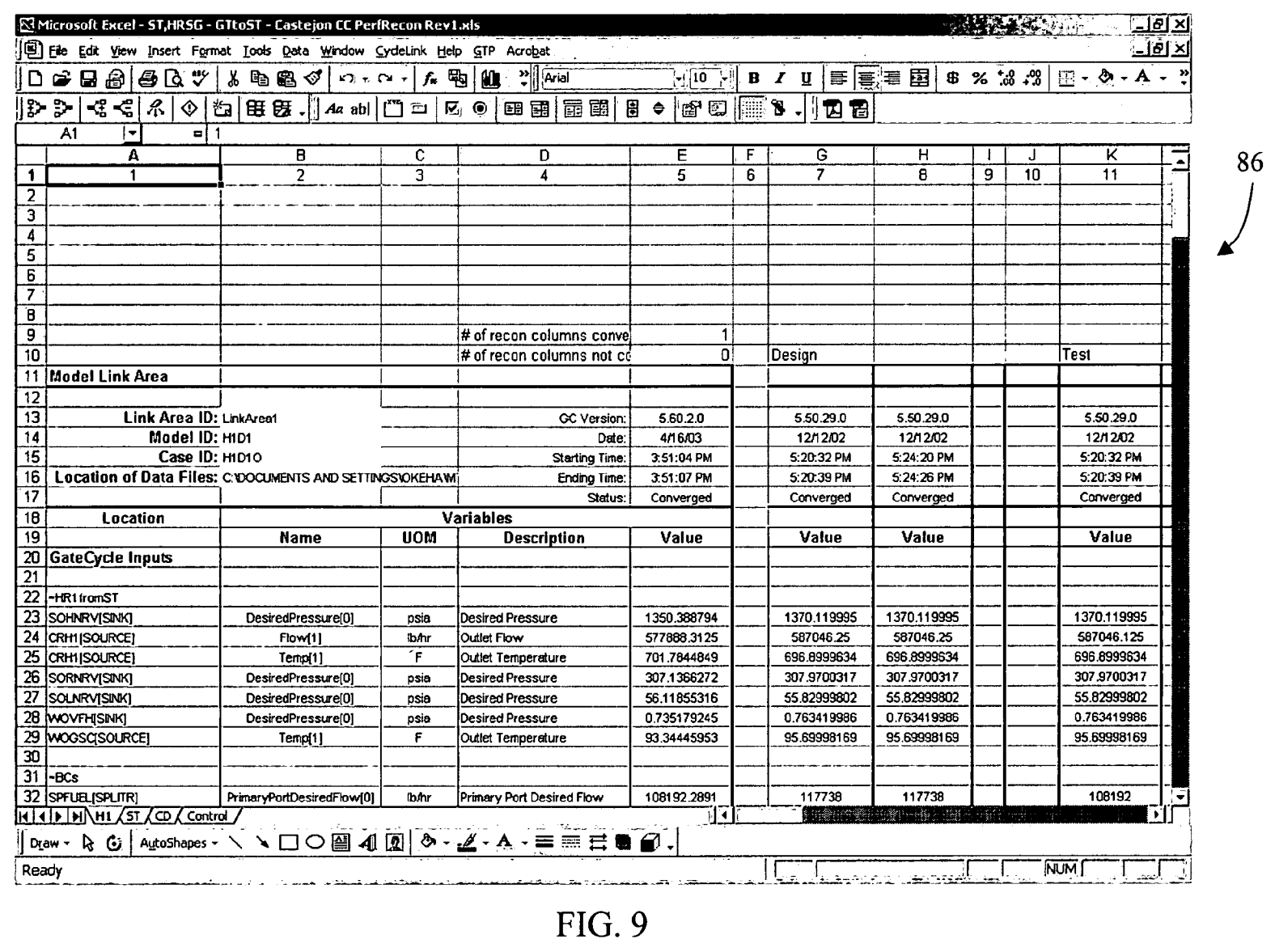

FIGS. 4-7 are exemplary screen shots of model modules used in modular modeling method 40 for a bottoming cycle of a 2×1 combined cycle power plant. A first HRSG model module 70 is shown in FIG. 4, a second HRSG model module 72 is shown in FIG. 5, a steam turbine model module 74 is shown in FIG. 6, and a CD/CT model module 76 is shown in FIG. 7. Modules 70-76 are linked by a control spreadsheet page 78 shown in FIG. 8. Spreadsheet 78 includes an Export/Import range definition area 80 that defines how modules 70-76 are linked and how data is exchanged between modules. Spreadsheet 78 also includes a Convergence Check area 82 and an Interfaces area 84 that details the module interfaces. FIG. 9 shows an exemplary spreadsheet page 86 that includes data associated with first HRSG model module 70.

Figure 10:
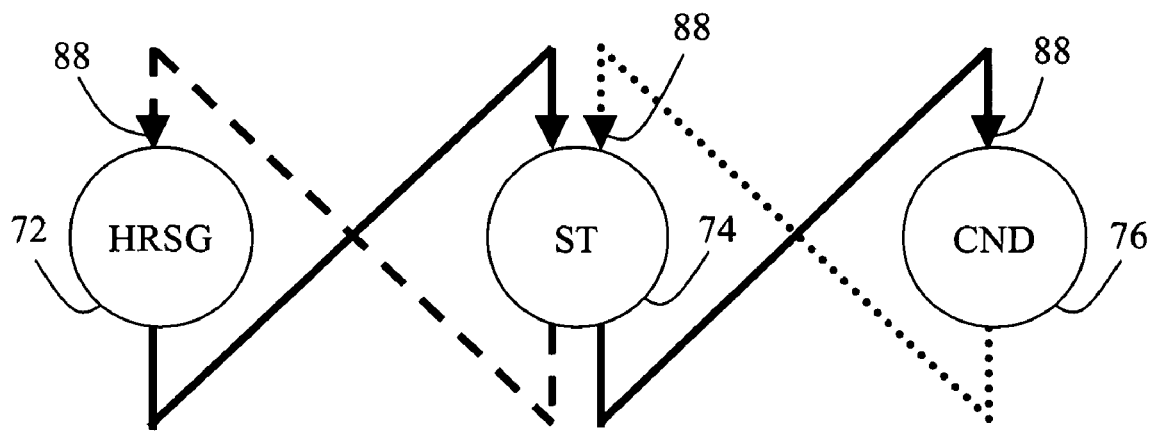
FIG. 10 is a schematic illustration of data exchange between modules.

Modules 70-76 are run in order one at a time with the results data being passed from each module to the next module. In one embodiment, modules 70-76 are run in the following order: HRSG 1 module 70, HRSG2 module 72, steam turbine module 74 and then CD/CT module 76. The running of modules 70-76 in succession is considered one pass through the model. As shown in FIG. 10, interface conditions 88 after each pass form the initial conditions for the next pass. Modules 70-76 are run successively until interface conditions converge or until the maximum number of passes specified by the user is reached.

Figure 11:
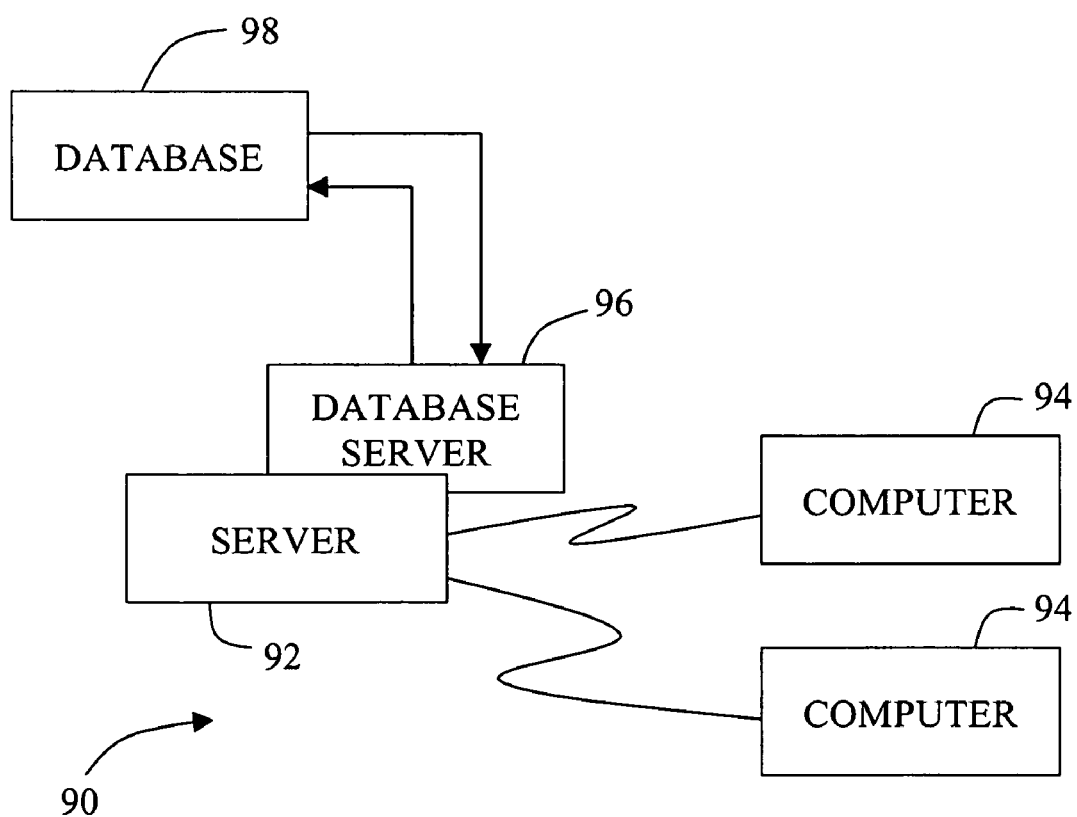
FIG. 11 is a simplified block diagram of a power plant modular modeling system that is used to analyze the power plant shown in FIG. 1.

FIG. 11 is a simplified block diagram of a power plant modular modeling system 90 that includes a server system 92, and a plurality of client sub-systems, also referred to as client systems 94, communicatively coupled to server system 92. In one embodiment, client systems 94 are computers including a web browser, such that server system 92 is accessible to client systems 94 via the Internet. Client systems 94 are interconnected to the Internet through many interfaces including a network, such as a local area network (LAN) or a wide area network (WAN), dial-in-connections, cable modems and special high-speed ISDN lines. Client systems 94 could be any device capable of interconnecting to the Internet including a web-based phone, personal digital assistant (PDA), or other web-based connectable equipment. A database server 96 is connected to a database 98 containing information regarding the library of module models. In one embodiment, centralized database 98 is stored on server system 92 and can be accessed by potential users at one of client systems 94 by logging onto server system 92 through one of client systems 94. In an alternative embodiment database 98 is stored remotely from server system 92 and may be non-centralized.

Modular method 40 of modeling power plants and modular modeling system 90 is used to assess the performance of major components and the equipment constituting the major components of the power plants. The speed and efficiency of modular modeling method 40 reduces performance analysis time and permits performance assessments of different plants with differences in the configuration of their major components without undue reconstruction of plant models.

While the invention has been described in terms of various specific embodiments, those skilled in the art will recognize that the invention can be practiced with modification within the spirit and scope of the claims.

What is claimed is:

1. A modular method of modeling a power plant, the power plant comprising a plurality of major components including at least one of a gas turbine, a heat recovery steam generator, a steam turbine, and a condenser/cooling tower, said method comprising:

selecting a plurality of major component modules' models from a library of component module models for each major component of the power plant, each major component module representing a power plant major component of a unique configuration;

inputting initial model information into a database for the major component selected modules by inputting the initial model information into a spread sheet associated with each selected major component module, the initial model information including at least one of operating parameters, design data, convergence criteria, and a maximum number of passes;

running each selected major component module and enabling data exchange between the selected major component modules, wherein running each selected major component module comprises running the selected major component modules successively one module at a time and passing the results from one module to the next module in succession until interface conditions converge or until a predetermined maximum number of iterative passes are completed; and generating a result that indicates the performance of the major components of the power plant.

2. A method in accordance with claim 1 wherein said running each selected major component module in succession comprises running each selected major component module in a predetermined order.

3. A method in accordance with claim 1 further comprising creating a library of major component module models.

4. A modular method of modeling a power plant having a plurality of components, said method comprising:

selecting at least two component module models from a library of component modules, each component module representing a power plant component of a unique configuration;

inputting initial model information into a database for the selected component modules by inputting initial model information into a spread sheet associated with each selected module, the initial model information including at least one of operating parameters, design data, convergence criteria, and a maximum number of passes;

running each selected component module and exchanging data between the selected component modules, wherein running each selected component module comprises running the selected component modules successively one module at a time and passing the results from one module to the next module in succession until interface conditions converge or until a predetermined maximum number of iterative passes are completed; and generating a result that indicates the performance of the major components of the power plant.

5. A method in accordance with claim 4 wherein said running each selected component module in succession comprises running each selected component module in a predetermined order.

6. A method in accordance with claim 4 further comprising creating a library of component module models.

7. A modular method of modeling a power plant, the power plant comprising a plurality of major components including at least one of a gas turbine, a heat recovery steam generator, a steam turbine, and a condenser/cooling tower, said method comprising:

creating a power plant model by selecting a plurality of major component modules' models from a library of component module models for each major component of the power plant, each major component module representing a power plant major component of a unique configuration;

linking the selected major component modules together to enable data exchange between modules;

inputting initial model information into a database for the selected major component modules by inputting initial model information into a spread sheet associated with each selected major component module, the initial model information including at least one of operating parameters, design data, convergence criteria, and a maximum number of passes;

running each selected major component module and exchanging data between the selected major component modules, wherein running each selected major component module comprises running the selected major component modules successively one module at a time and passing the results from one module to the next module in succession until interface conditions converge or until a predetermined maximum number of iterative passes are completed; and generating a result that indicates the performance of the major components of the power plant.

8. A method in accordance with claim 7 wherein said running each selected major component module in succession comprises running each selected major component module in a predetermined order.

9. A method in accordance with claim 7 further comprising creating a library of major component module models.

10. A power plant modular modeling system comprising a database operationally coupled to a computer, said database comprising a Library of power plant major component module models, each major component module representing a power plant major component of a unique configuration, said computer configured to:

create a power plant model by selecting a plurality of major component modules' models from the library of component module models for each major component of the power plant;

link the selected major component modules together to enable data exchange between modules;

receive initial model information from a user for the selected major component modules, the initial model information including at least one of operating parameters, design data, convergence criteria, and a maximum number of passes;

store the initial model information in a spread sheet associated with each selected major component module; and running each selected major component module including exchanging data between the selected major component modules, wherein running each selected major component module comprises running the selected major component modules successively one module at a time and passing the results from one module to the next module in succession until interface conditions converge or until a predetermined maximum number of iterative passes are completed.

11. A system in accordance with claim 10 wherein said computer is further configured to run each selected major component module in a predetermined order.

* * * * *